United States Patent [19]

Field et al.

[11] Patent Number: 4,707,742
[45] Date of Patent: Nov. 17, 1987

[54] VIDEO SIGNAL PROCESSING ARRANGEMENT

[75] Inventors: Anthony J. Field; Atma Heerah; Thomas C. Mackereth, all of Cambridge, England

[73] Assignee: U.S. Philips Corporation, New York, N.Y.

[21] Appl. No.: 724,848

[22] Filed: Apr. 17, 1985

[30] Foreign Application Priority Data

Apr. 26, 1984 [GB] United Kingdom ............... 8410704
Apr. 26, 1984 [GB] United Kingdom ............... 8410706
Apr. 26, 1984 [GB] United Kingdom ............... 8410709
Jul. 9, 1984 [GB] United Kingdom ............... 8417439

[51] Int. Cl.$^4$ ..................... H04N 5/272; H04N 5/262
[52] U.S. Cl. ................................. 358/183; 358/22; 358/160; 358/180
[58] Field of Search ............... 358/22, 160, 180, 181, 358/182, 183, 185; 340/727

[56] References Cited

U.S. PATENT DOCUMENTS

| 3,812,286 | 5/1974 | Tkacenko | 358/182 |
| 3,821,468 | 6/1974 | Busch | 358/22 |
| 3,983,328 | 9/1976 | Newell | 358/126 |
| 4,266,242 | 5/1981 | McCoy | 358/22 |
| 4,306,249 | 12/1981 | Croll | 358/160 |
| 4,393,394 | 7/1983 | McCoy | 358/22 |
| 4,402,012 | 8/1983 | Knight | 358/160 |
| 4,462,024 | 7/1984 | Strolle | 340/727 |
| 4,533,952 | 8/1985 | Norman, III | 358/160 |
| 4,602,286 | 7/1986 | Kellar et al. | 358/22 X |
| 4,611,232 | 9/1986 | Seavby | 358/160 |

FOREIGN PATENT DOCUMENTS

| 0017579 | 2/1981 | Japan | 358/183 |
| 0179064 | 10/1983 | Japan | 358/160 |

Primary Examiner—Michael A. Masinick
Assistant Examiner—E. Anne Faris
Attorney, Agent, or Firm—Thomas A. Briody; William J. Streeter; Gregory P. Gadson

[57] ABSTRACT

A video signal processing arrangement for television signals encoded in digital form comprising means for compressing and/or expanding the size of the television picture represented by the video signal and means for rotating the television picture represented by the video signal is disclosed. The rotating means is separate from the compressing and/or expanding means and is switchable between a position prior to the compressing and/or expanding means in the video signal processing chain and a position subsequent to the compressing and/or expanding means. An arrangement having two separate video signal paths which are later combined to produce a composite picture is also described in which the rotating means can also be positioned after the combining means as well as before or after the compressing and/or expanding means in either path.

3 Claims, 21 Drawing Figures

VIDEO SIGNAL PROCESSING ARRANGEMENT

BACKGROUND OF THE INVENTION

The invention relates to a video signal processing arrangement for television signals encoded in digital form comprising means for compressing and/or expanding the size of the television picture represented by the video signal and means for rotating the television picture represented by the video signal.

The invention further relates to a video signal processing arrangement for television signals encoded in digital form comprising first and second video signal inputs, a video signal output, first means for compressing and/or expanding the size of a television picture represented by the first video signal, second means for compressing and/or expanding the size of a television picture represented by the second video signal, means for combining the outputs of the first and second compressing and/or expanding means, and means for rotating the television picture represented by a video signal.

Television video effects generators normally provide facilities for compressing (squeezing) and expanding (zooming) the television picture represented by a video signal derived from a picture source (television camera, video tape recorder, etc). Such generators may also include means for rotating the television picture either about an axis normal to the picture or an axis in the plane of the picture. Further, the generator may be a multichannel arrangement with the output of each channel fed to a mixing circuit so that two or more video signals may be compresed or expanded independently and allocated to desired portions of the final picture.

It has been found that when the rotator is connected at the channel input and the rotated picture is subsequently squeezed, part of the picture may be lost at the corners. An arrangement has been used in which the compressing and/or expanding means is combined with the rotating means in a single unit. However this produces a complex arrangement which is expensive and comparatively complicated to operate when certain effects are desired. Also, in a multichannel device a single channel has to be reserved for rotational effects, as the combined unit is too expensive to provide in each channel. Further, if two or more video signals are mixed the mixed signal cannot be rotated unless a further rotator is provided.

SUMMARY OF THE INVENTION

It is an object of the invention to enable the provision of a video signal processing arrangement of comparatively simple construction which in some circumstances can overcome the problem of losing part of the picture when rotational effects are produced.

The invention provides a video signal processing arrangement as set forth in the opening paragraph characterized in that the rotating means is separate from the compressing and/or expanding means and that the rotating means is switchable between a position prior to the compressing and/or expanding means in the video signal processing chain and a position subsequent to the compressing and/or expanding means.

By moving the rotating means to the output of the compressing and/or expanding means the loss of the corners of the picture when rotating a squeezed picture can be avoided. However, depending on the position chosen for the squeezed picture a different effect may be produced by rotating after squeezing from the effect produced by squeezing after rotating. Further, if the compressing/expanding means produces additional effects, such as multiple pictures, prior rotation rotates all the pictures separately while subsequent rotation rotates the group of pictures. Thus, by using a single rotator and switching it beween the input and output of the compressing and/or expanding means an increased variety of effects may be produced with a small increase in cost, while for certain effects the loss of corners of the picture may be eliminated.

The invention further provides a video signal processing arrangement as set forth in the second paragraph characterized in that the rotating means is separate from the first and second compressing and/or expanding means and that the position of the rotating means is switchable between a position prior to the first or second compressing and/or expanding means in the signal processing chain and a position subsequent to the combining means.

This enables a single rotator to be used to rotate either the first or the second television pictures represented by the first and second video signals or to rotate the combined picture formed by the combining means.

The rotating means may additionally be switchable to a position between the first or second compressing and/or expanding means and the combining means.

This enables a single rotating means to be used to produce a variety of effects and to be located at the optimum position within the signal processing arrangement for any selected effect.

The signal processing arrangement may comprise means for switching the position of the rotating means, the switching means being arranged to maintain a bypass path around the rotator for a period equal to the signal delay introduced by the rotator.

This ensures that there is no momentary loss of picture when the position of the rotator is switched.

DESCRIPTION OF THE DRAWINGS

Embodiments of the invention will now be described, by way of example, with reference to the accompanying drawings, in which.

DETAILED DESCRIPTION

Figure 1:
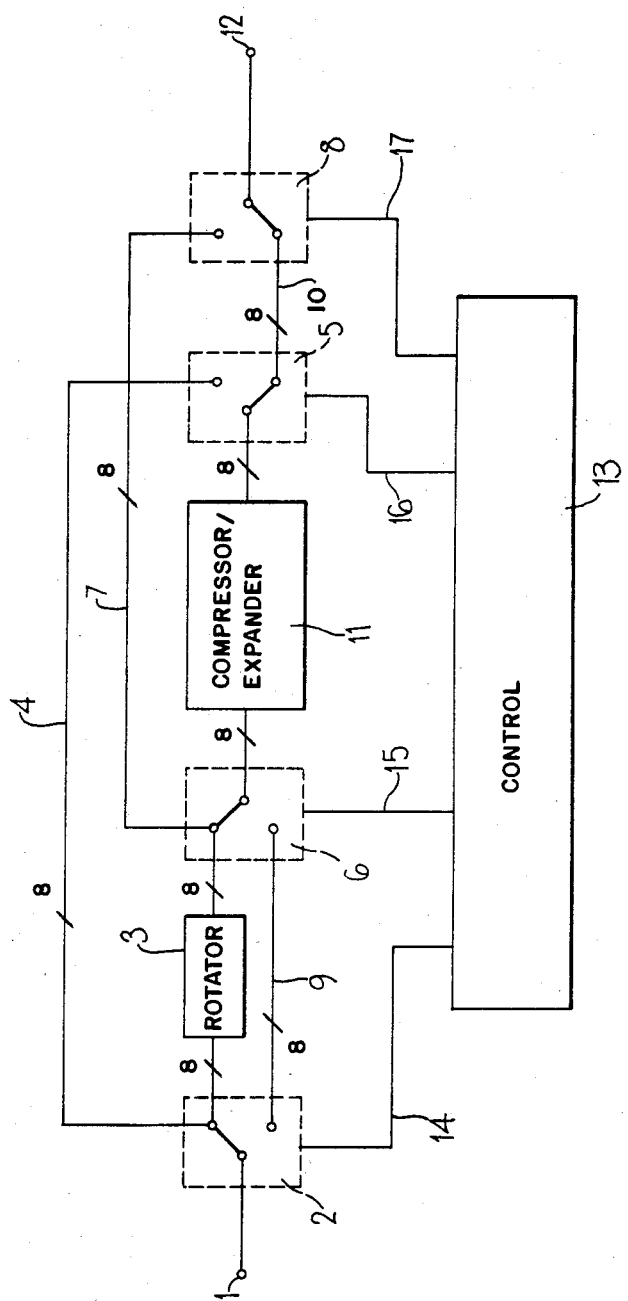
FIG. 1 shows in block schematic form a first video signal processing arrangement according to the invention.

The video signal processing arrangement shown in FIG. 1 comprises a video signal input terminal 1 which is connected to the pole of a changeover switching arrangement 2. The first contact of the switching arrangement 2 is connected to the input of the rotator or means 3 for rotating a television picture represented by the input video signal and, via a line 4, to a first contact of a changeover switching arrangement 5. The output of the rotating means 3 is connected to a first contact of a changeover switching arrangement 6 and, via a line 7, to a second contact of a changeover switching arrangement 8. The second contact of the changeover switching arrangement 2 is connected to the second contact of the changeover switching arrangement 6 via a line 9, while the first contact of the changeover switching arrangement 5 is connected to the first contact of the changeover switching arrangement 8 via a line 10. The pole of the changeover switching arrangement 6 is connected to the input of the compressor/expander or means 11 for compressing and/or expanding the television picture represented by the input video signal. The output of the compressing and/or expanding means 11 is connected to the pole of switching arrangement 5 while the pole of switching arrangement 8 is connected to a video signal output terminal 12. A control arrangement 13 is connected to control inputs of the switching arrangements 2,6,5, and 8 via lines 14,15,16 and 17 respectively.

In operation, an input video signal is applied to terminal 1, and with the switches in the positions shown, passes through the rotating means 3 before passing through the compressing and/or expanding means 11, the output of the means 11 being directly connected to the output terminal 12 via the line 10. In practice the input video signal may be encoded as an eight bit binary code and be applied in parallel at a sampling rate of 13.5 MHz. The lines 4,7,9 and 10 would then be 8-bit buses or highways, as would the input and output of the means 3 and 11. The changeover switching arrangements 2,5,6, and 8 are electronic switches formed, for example, by tri-state output buffers and latches as appropriate. The control arrangement 13 may take instructions by means of manualy operable switches and produce appropriate control signals on lines 14,15,16 and 17.

As the rotating means 3 introduces a significant signal delay, possibly of the order of four television field periods, the control circuit 13 is preferably such that the by-pass links 9,10 are maintained for the delay period at the switchover time so that the video signal produced at output 12 is continuous. The switching instants are preferably located during the field blanking periods, and a variable delay may be inserted in the rotating means 3 to enable an overall delay equal to a whole number of field periods to be achieved.

Figure 2:
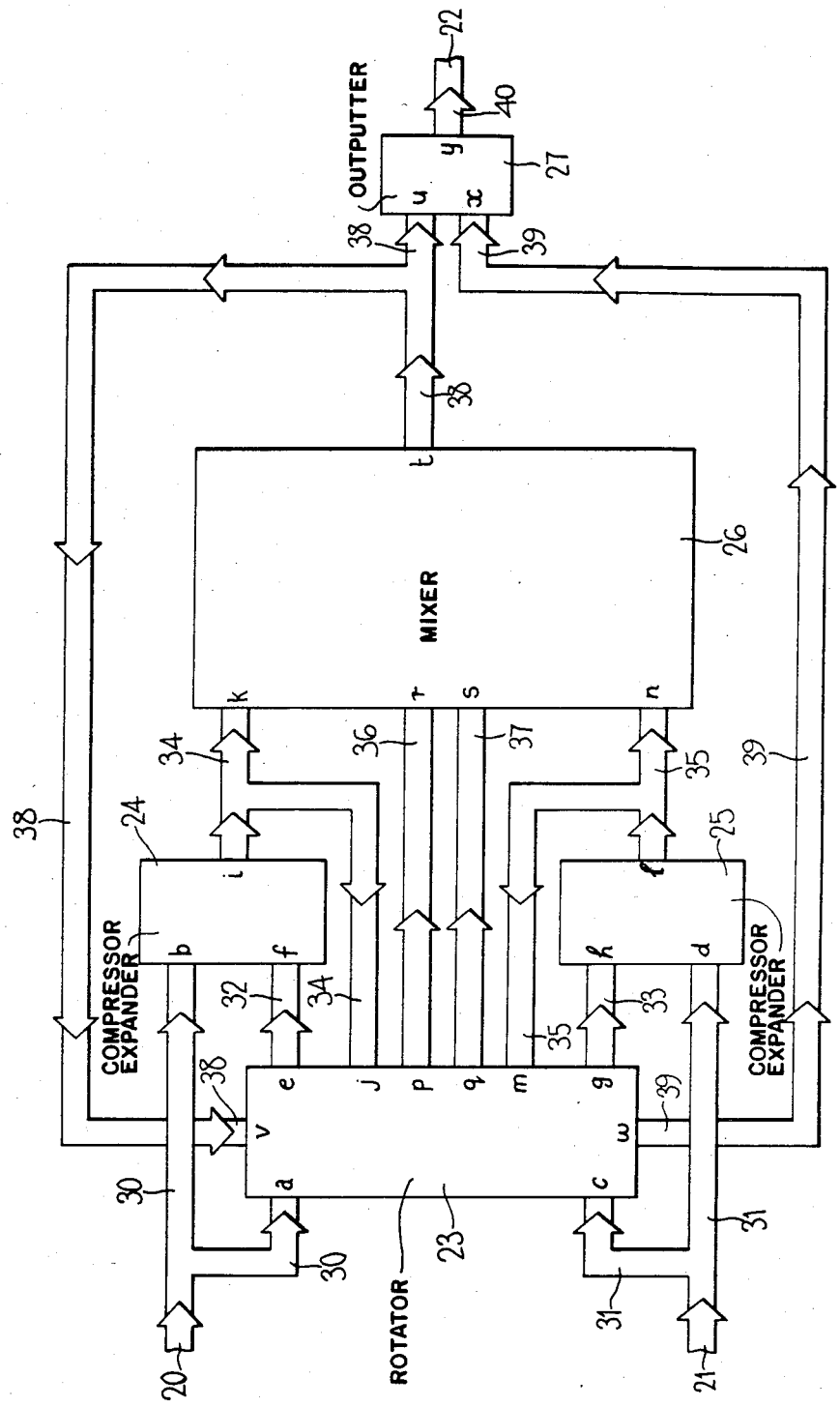
FIG. 2 shows in block schematic form a video signal processing arrangement according to the invention capable of processing two input video signals simultaneously.

FIG. 2 shows an arrangement having a first video signal input 20, a second video signal input 21, and a video signal output 22. The arrangement shown in FIG. 2 further comprises rotator or means 23 for rotating a television picture represented by an input video signal, first compressor/expander or means 24 for compressing and/or expanding a television picture represented by an input signal, second compressor/expander or means 25 for compressing and/or expanding a television picture represented by an input video signal, mixer or means 26 for combining two or more video signals and outputter or output means 27 for transferring the combined video signals to the output 22.

The first video input 20 is connected via an 8-bit parallel highway to a first input a of the rotating means 23 and to a first input b of the first compressing and/or expanding means 24, while the second video input 21 is connected via an 8-bit parallel highway to a second input c of the rotating means 24 and to a first input d of the second compressing and/or expanding means 25. A first output e of the rotating means 23 (hereinafter referred to as the rotator 23) is connected to a second input f of the first compressing and/or expanding means 24 (hereinafter referred to as the first compressor 24) via an 8-bit parallel highway 32. A second output g of the rotator 23 is connected to a second input h of the second compressing and/or expanding means 25 (hereinafter referred to as the second compressor 25) via an 8-bit parallel highway 33. The output i of the first compressor 24 is connected via an 8-bit parallel highway 34 to a third input j of the rotator 23 and a first input k of the combining means 26. The output l of the second compressor 25 is connected via an 8-bit parallel highway 35 to a fourth input m of the rotator 23 and to a second input n of the combining means 26. Third and fourth outputs p and q of the rotator 23 are connected to third and fourth inputs r and s of the combining means 26 via 8-bit parallel highways 36 and 37, respectively. The output t of the combining means 26 is connected via an 8-bit parallel highway 38 to a first input u of the output means 27 and to a fifth input v of the rotator 23. A fifth output w of the rotator 23 is connected by an 8-bit parallel highway 39 to a second input x of the output means 27 while the output y of the output means 27 is connected to the output 22 of the arrangement via an 8-bit parallel highway 40. Each of the inputs of the rotator 23, compressors 24 and 25, combining means 26 and output means 27 comprise latches which can be enabled by control signals applied thereto so that when selected they capture data on the highway to which they are connected. Thus to select the position of the rotator 23 it is only necessary to enable the appropriate input latches. Since none of the highways have more than one output connected to them all the outputs can be permanently enabled.

and perspective and the three angles of rotation about the three axes the positions of the points a,b,c, and d which define the corners of the rotated picture by multiplying the positions of the corners of the screen by the matrices $$\begin{vmatrix} \cos A & -\sin A & 0 & 0 \\ \sin A & \cos A & 0 & 0 \\ 0 & 0 & 1 & 0 \\ Xr - Xr\cos A - Yr\sin A & Yr + Xr\sin A - Yr\cos A & 0 & 1 \end{vmatrix}$$

in the case of rotation, and $$\begin{vmatrix} \cos C & 0 & \sin C & 0 \\ \sin B \sin C & \cos B & -\sin B \cos C & 0 \\ -\cos B \sin C & \sin B & \cos B \cos C & 0 \\ Xp - Xp\cos B - Yp\sin B \sin C & Yp - Yp\cos B & Yp\sin B \cos C - Xp\sin C & 1 \end{vmatrix}$$

in the case of perspective, where
  A is the angle of rotation
  B is the angle of perspective about the horizontal axis,
  C is the angle of perspective about the vertical axis,
  Xr, Yr are the co-ordinates of the center of rotation, and
  Xp, Yp are the co-ordinates of the center of perspective.

If rotation and perspective are applied simultaneously the positions of the points a,b,c, and d are determined by multiplying the positions of the corners of the screen by one matrix and then multiplying the result by the other matrix.

An embodiment of means for rotating a television picture represented by an input video signal suitable for use as the rotating means 3 or 23 is shown in FIGS. 3 to 10.

Figure 3:
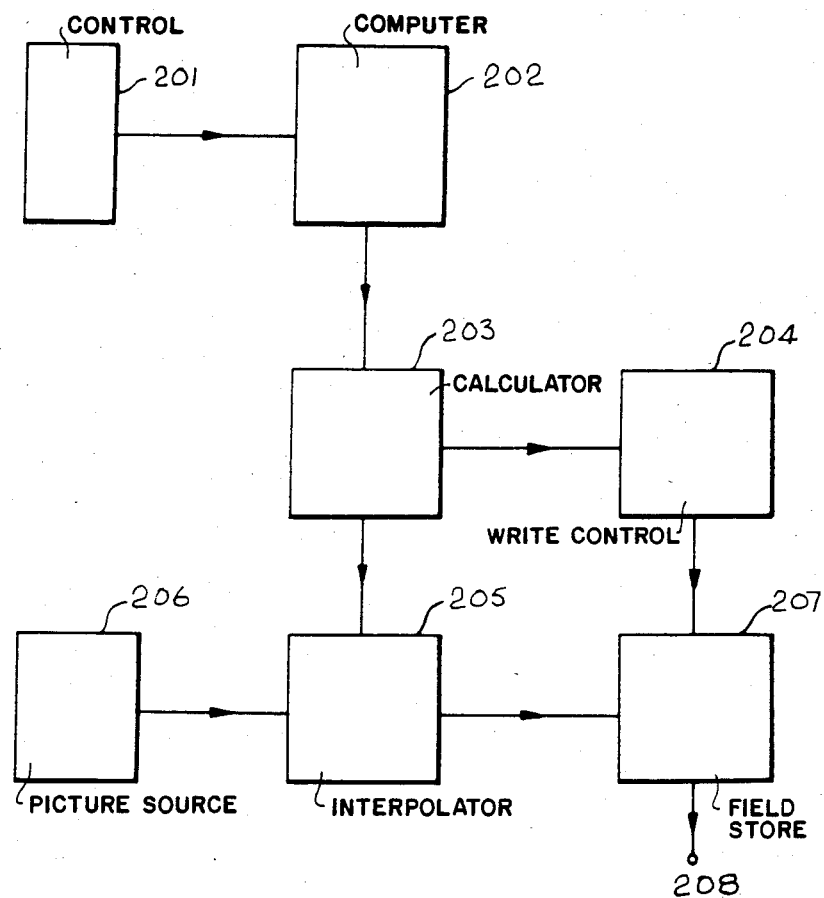
FIG. 3 shows in block schematic form an arrangement for rotating a television picture about an axis perpendicular to the plane of the picture and/or one or both of two axes in the plane of the picture suitable for use as the rotating means of FIG. 1 or FIG. 2.

FIG. 3 shows in block schematic form an arrangement for rotating a television picture about an axis perpendicular to the picture and/or two axes parallel to the plane of the picture. The arrangement comprises a control unit 201 which may contain selection switches, control potentiometers, and analogue-to-digital converters to produce control signals which are fed to a computer 202. The control unit 201 produces signals to specify the positions of the axes of rotation and the speed of rotation about those axes. The computer 202 together with a hardware calculator 203 produce control signals for a store write control unit 204 and a video signal interpolator 205. The interpolator 205 receives video signals from a picture source 206 and feeds interpolated signal samples to a field store 207 where the samples are inserted in the desired location by the write control unit 204. The output of the field store 207 is fed to an output 208 which is connected to other units in an effects generator. The term field store is intended to mean a store capable of storing one or more fields of a television picture and, in particular, includes a frame store which stores two fields of a television picture.

In this specification a rotation of the picture about an axis perpendicular to the plane of the picture will be referred to as rotation while a rotation of the picture about an axis parallel to the plane of the picture will be referred to as perspective. While, in principle the axes parallel to the plane of the picture may extend in any direction in the following description it will be assumed that these axes are horizontal and vertical.

The control unit 201 provides signals to the computer 202 which specify the point about which rotation is to take place (center of rotation) and the point about which perspective is to take place (center of perspective). Further the angles of rotation and perspective are set by the control unit 201. The centers of rotation and pespective may be set by means of a conventional cursor control while the angles of rotation and perspective may be set by switches or, if continuous resolution is desired potentiometer control. The form and construction of such control units is well known to those skilled in the art.

Figure 4:
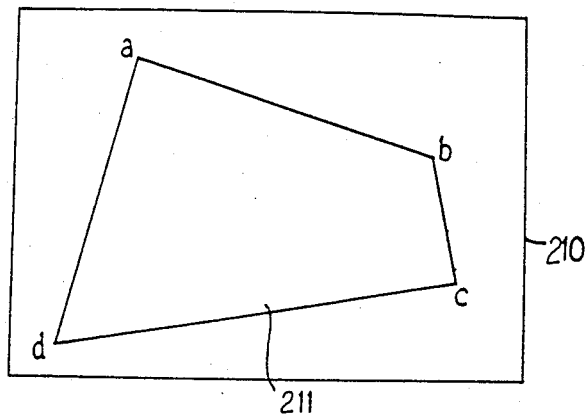
FIG. 4 shows the outline of a rotated picture on a television screen.

FIG. 4 shows a television picture screen 210 on which the outline of a picture 211 which has been rotated about axes parallel to the screen and, optionally, about an axis perpendicular to the screen is shown. The computer 202 determines from the centers of rotation The field store 207 is arranged as an analog of the picture screen and contains 720 locations for storing picture samples of each of 576 lines, i.e. $720 \times 576$ locations thus any store location can be considered to have co-ordinates (x,y) defining the position at which that sample will be displayed and starting from (0,0) in the top left hand corner and ranging to (719,575) in the bottom right hand corner. These co-ordinates are referred to as being in the output plane. The picture received from the picture source 206 will likewise consist of 720 samples per line and 576 lines per frame. When perspective is performed these samples have to be compressed to fit within a picture frame such as that shown as 211 in FIG. 4. Thus it is necessary to convert each input sample point within the picture frame 211 to co-ordinates relating to the output plane.

Figure 5:
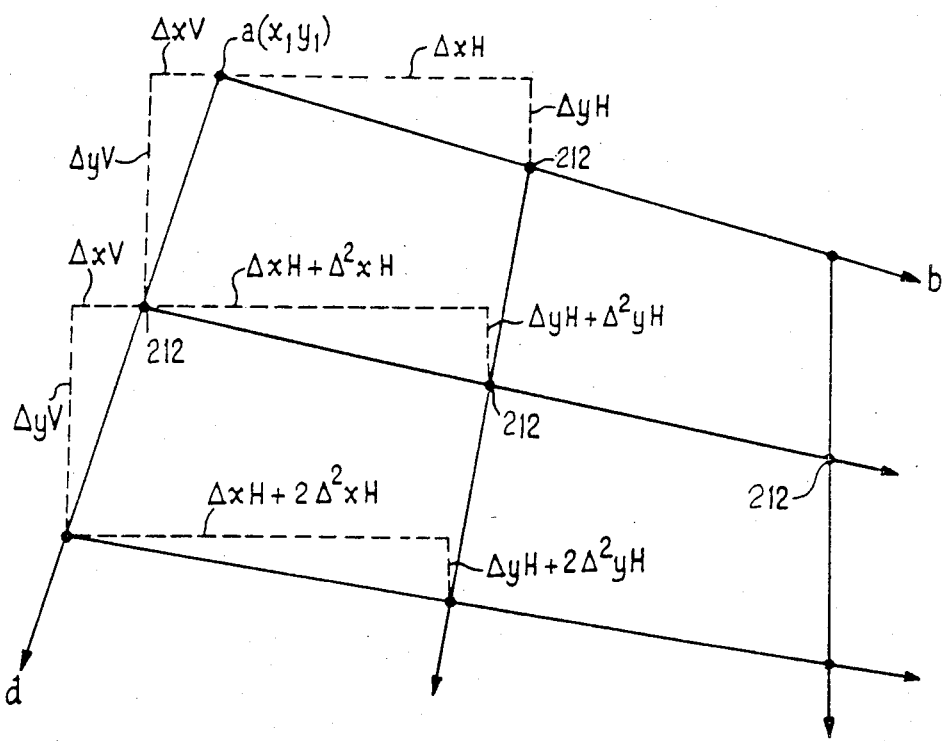
FIG. 5 shows on an enlarged scale a portion of the rotated picture of FIG. 4 to illustrate the location of samples in the input plane and a method of traversing the samples in the output plane.

Referring to FIGS. 4 and 5 and given the four points $a(x_1,y_1)$, $b(x_2,y_2)$, $c(x_3,y_3)$, and $d(x_4,y_4)$ defined by a perspective projection incremental terms $\Delta xH$ and $\Delta yH$ can be derived which allow the line ab (a horizontal input line) to be traversed in the output plane.

$$\text{Thus } \left. \begin{array}{l} \Delta xH = (x_2 - x_1)/m \\ \Delta yH = (y_2 - y_1)/m \end{array} \right\} \ 1$$

where m is the number of picture elements per line
Similarly for line ad $$\left. \begin{array}{l} \Delta xV = (x_4 - x_1)/n \\ \Delta yV = (y_4 - y_1)/n \end{array} \right\} \ 2$$

where n is the number of lines per frame.

By considering the incremental values $\Delta xH'$ and $\Delta yH'$ along cd the change of increments for sequential horizontal lines can be derived as follows.

$$\text{From } dc \ \Delta xH' = (x_3 - x_4)/n$$
$$\Delta yH' = (y_3 - y_4)/n$$
$$\text{Thus } \left. \begin{array}{l} \Delta^2 xH = (\Delta xH - \Delta xH')/n \\ \Delta^2 yH = (\Delta yH - \Delta yH')/n \end{array} \right\} \quad 3$$

where $\Delta^2 xH$ and $\Delta^2 yH$ are the changes in increments $\Delta xH$ and $\Delta yH$ with sequential input lines.

From which the increments to traverse any horizontal line $$\left. \begin{array}{l} \Delta x'H = \Delta xH + y_n \Delta^2 xH \\ \Delta y'H = \Delta yH + y_n \Delta^2 yH \end{array} \right\} \quad 4$$

where $y_n$ is the horizontal line number starting from zero at line ab.

Similarly by considering the incremental values along bc the change of increments for picture elements along the horizontal lines $\Delta^2 xV$ and $\Delta^2 yV$ can be derived $$\left. \begin{array}{l} \Delta^2 xV = (\Delta xV' - \Delta xV)/m \\ \Delta^2 yV = (\Delta yV' - \Delta yV)/m \end{array} \right\} \quad 5$$

$$\text{Hence } \left. \begin{array}{l} \Delta x'V = \Delta xV + x_n \Delta^2 xV \\ \Delta y'V = \Delta yV + x_n \Delta^2 yV \end{array} \right\} \quad 6$$

where $x_n$ is the picture element number starting from zero at line ad.

By combining equations (4) and (6) with the starting point $x_1, y_1$ the values of co-ordinates $x', y'$ of any input picture element in the output plane can be determined.

$$x' = x_1 + y_n \Delta xV + x_n (\Delta xH + y_n \Delta^2 xH)$$

$$y' = y_1 + y_n \Delta yV + x_n (\Delta yH + y_n \Delta^2 yH).$$

FIG. 5 illustrates a number of picture elements 212 of the input picture signal in the rotated input plane starting from the point a and the incremental additions to define their co-ordinates in the output plane.

Figure 6:
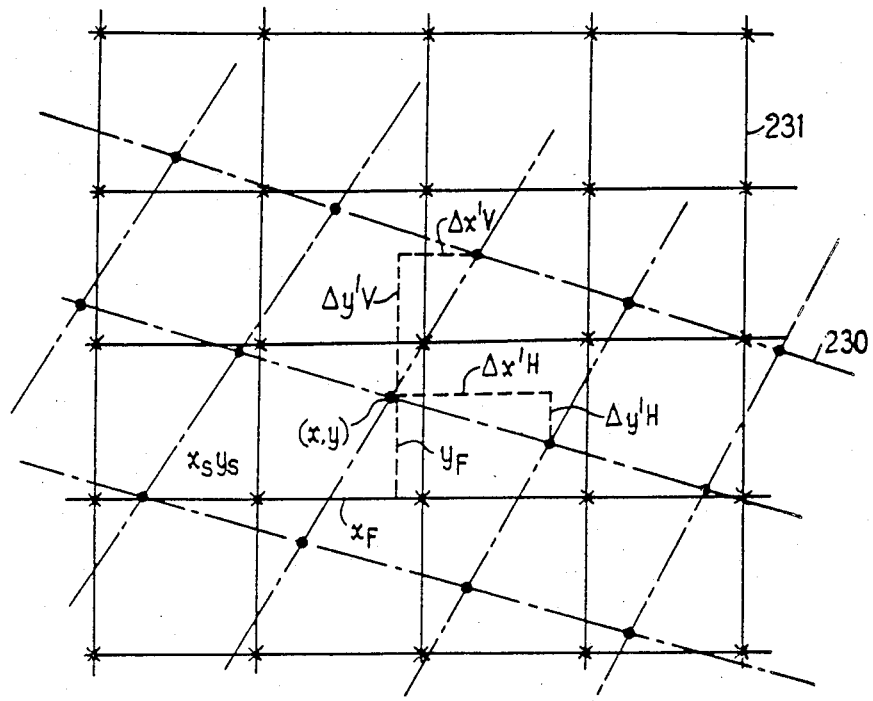
FIG. 6 shows the superimposition of the input and output planes.
Figure 7:
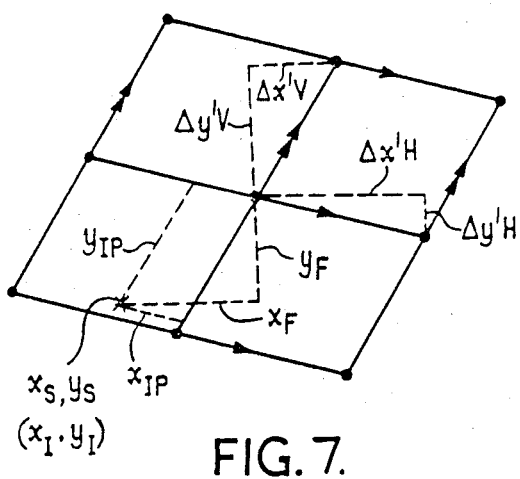
FIG. 7 illustrates assumptions made for interpolation of the input signal.

Consider now the integer part of $x'$ as $x^I$ and the integer part of $y'$ as $y^I$. These represent $x'$ and $y'$ truncated to fit the possible output plane positions. The integer parts $x^I$ and $y^I$ give the address for the field store while the fractional remainders $x_F$ and $y_F$ give the distance from $x', y'$ of the addressed point in the output plane. FIG. 6 illustrates this construction with the input plane 230 shown by chain dotted lines and the output plane 231 by solid lines. In order to provide the interpolator 205 with the necessary co-efficients it is necessary to convert from output plane co-ordinates to input plane co-ordinates. To achieve this it is assumed that over the small area over which interpolation takes place adjacent lines are parallel and adjacent sample positions are parallel, i.e. that four adjacent sample positions in the input plane are at the corners of a parallelogram. FIG. 7 illustrates the assumptions made in deriving the equations. In practice the angle between two adjacent lines is always less than $\frac{1}{2}°$. Thus the interpolator positions $x_{Ip}$ and $y_{Ip}$ are defined by $$x_{Ip} = (y_F \Delta x'V - x_F \Delta y'V)/(\Delta y'V \cdot \Delta x'H - \Delta x'V \cdot \Delta y'H)$$

$$y_{Ip} = -(y_F \Delta x'H - x_F \Delta y'H)/(\Delta y'V \cdot \Delta x'H - \Delta x'V \cdot \Delta y'H)$$

Since the transformation of input points to the output plane in areas of compression is being considered values of $x_{Ip}$ and $y_{Ip}$ greater than one will be obtained in some instances. These values indicate that these positions are redundant and they are consequently discarded.

Thus the computer 202 produces once per frame, ten parameters $x_1$, $y_1$, $\Delta xH$, $\Delta yH$, $\Delta^2 xH$, $\Delta^2 yH$, $\Delta xV$, $\Delta yV$, $\Delta^2 xV$, and $\Delta^2 yV$ and supplies them to the hardware calcultor 203. The calculator 203 then provides at the picture element rate $x^I$ and $y^I$ to the store write control unit and $x_{Ip}$ and $y_{Ip}$ to the interpolator 205.

Figure 8:
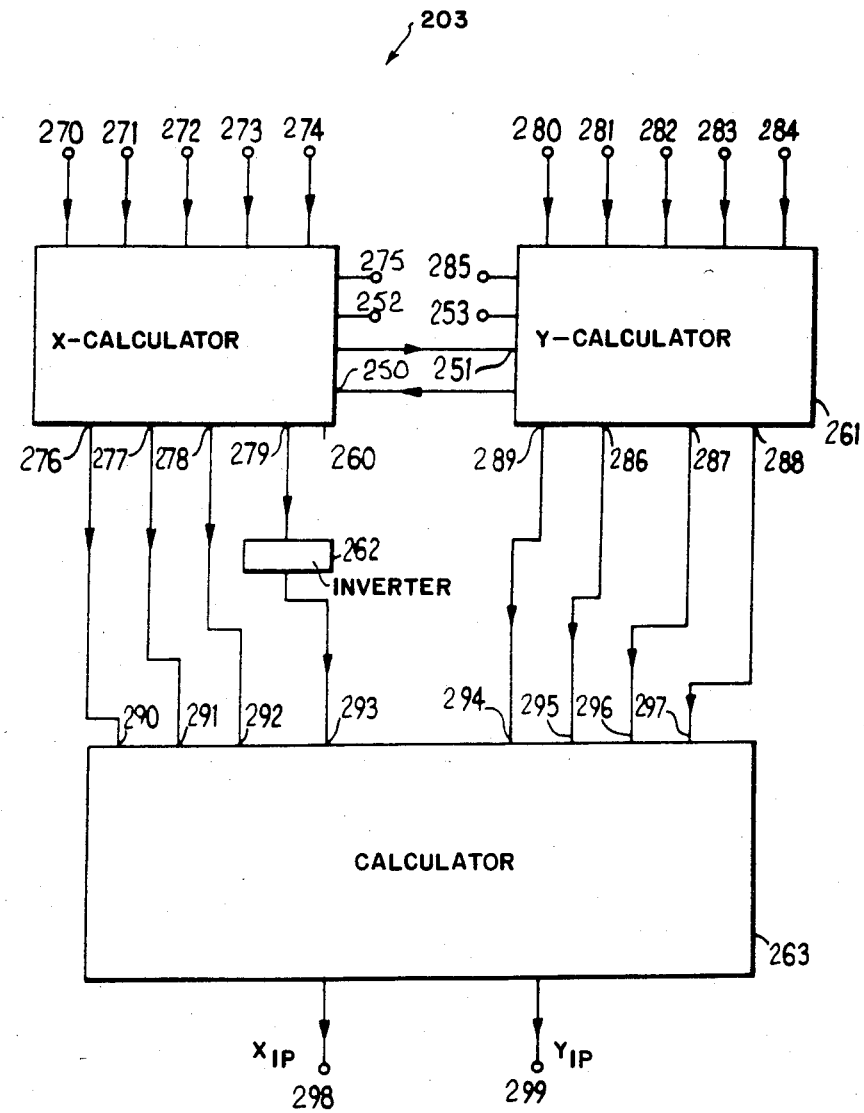
FIG. 8 illustrates in block schematic form the hardware calculator of FIG. 3.

The hardware calculator 203 is shown in block schematic form in FIG. 8 and comprises first and second identical blocks 260 and 261, an inverter 262 and a third block 263. The block 260 has five inputs 270 to 274 to which the parameters $\Delta xH$, $\Delta^2 xH$, $\Delta^2 xV$, $xV$ and $x_1$ respectively are applied by the computer 202 while the block 261 has five inputs 280 to 284 to which the parameters $\Delta yH$, $\Delta^2 yH$, $\Delta hu 2yV$, $\Delta yV$, and $y_1$ respectively are applied by the computer 202. The block 260 has five outputs 275 to 279 which provide the calculated values $x^I$, $x_F$, $\Delta x'H$, $\Delta x'V$, and $\Delta x'V \cdot \Delta y'H$, while the block 261 has five outputs 285 to 289 which provide the calculated values $y^I$, $y_F$, $\Delta y'H$, $\Delta y'V$, and $\Delta x'H \cdot \Delta y'V$. The block 260 has a further input 250 to which the calculated value of $y'H$ is applied while the block 261 has a further input 251 to which the calculated value of $\Delta x'H$ is applied. The block 260 has a further output 252 which provides an instruction to the sample address counter in the store write control 204 to increment or decrement at the sample rate while the block 261 has a further output 253 which provides an instruction for the line address counter to increment or decrement at the sample rate. It should be noted that the outputs $x^I$ and $y^I$ set the starting points for the address counters at the start of each line.

The block 263 has eight inputs 290 to 297 to which are connected $x_F$, $\Delta x'H$, $\Delta x'V$, the output of inverter 262 ($\overline{\Delta x'V \cdot \Delta y'H}$), $\Delta x'H \cdot \Delta y'V$, $y_F$, $\Delta y'H$, and $\Delta y'V$ respectively. The block 263 has two outputs 298 and 299 at which the calculated values of $x_{Ip}$ and $y_{Ip}$ respectively are available.

Figure 9:
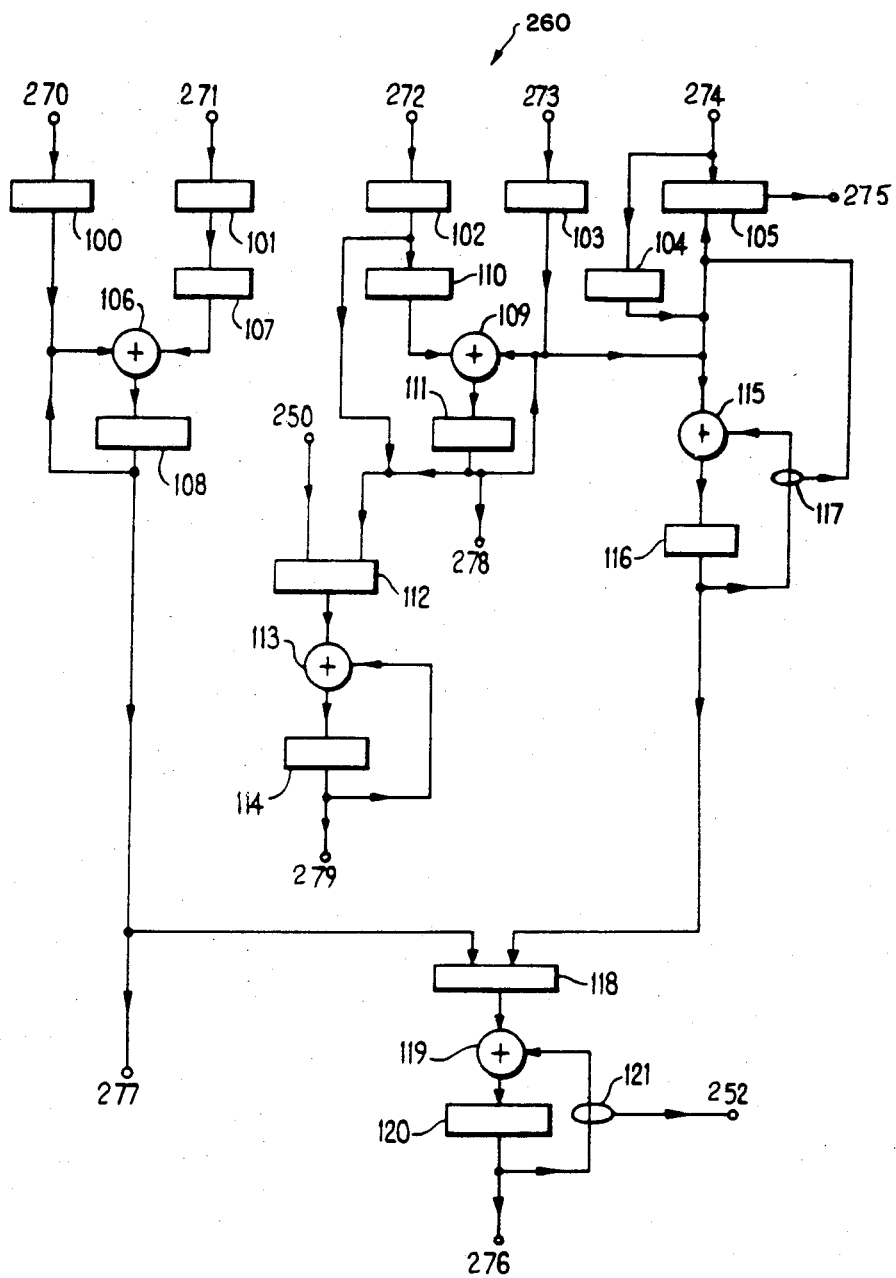
FIG. 9 shows a part of the hardware calculator of FIG. 8 in greater detail.

FIG. 9 shows an embodiment of the block 260. The block 261 is identical to the block 260 and thus will not be separately described, it being sufficient to note that block 260 calculates the x co-ordinates while block 261 calculates the y co-ordinates.

As shown in FIG. 9 the inputs 270 to 274 are connected to respective 12 bit latches 100 to 104, these latches having tri-state outputs. The input 274 is also connected to pre-setting inputs of an up/down counter 105. The information at inputs 270 to 274 is clocked into the latches and counter during the field blanking interval. The information presented by the computer 202 at the input 274 is split into an integer portion which is fed to the counter 105 and a fractional portion which is fed to the latch 104. Alternatively separate inputs may be provided for the integer and fractional portions of $x_1$. The output of the latch 100 is connected to a first input of an adder 106 while the output of the latch 101 is connected to a latch 107 whose output is connected to a second input of the adder 106. The latch 107 is resetable to zero output by the application of a reset signal. The output of the adder 106 is connected to the input of latch 108 which has a tri-state output which is connected to the first input of the adder 106 and to the output 277. For the first line the output of latch 100 is enabled and that of latch 107 set to zero and hence the contents of latch 100 are read into latch 108. The output of latch 100 is then disabled until the start of the next field while the output of latch 108 is enabled to produce the value x'H at output 277 and at the first input of the adder 106. The contents of latch 101 is read into the latch 107 and $\Delta^2$xH is added to the contents of latch 108 at the line rate by appropriate clocking of the inputs of latch 108. A similar arrangement is formed by latches 102 and 103 together with an adder 109, a latch 110 which has outputs pre-settable to zero, and a latch 111 having tri-state outputs. This produces the value $\Delta$x'V at output 278 but in this case the latch 111 is clocked at the picture element rate. The outputs of latches 102 and 111 are also connected to a first input of a multiplier 112 whose second input is connected to input 250 which receives the value $\Delta$y'H from the unit 261. The output of the multiplier 112 is accumulated in an arrangement comprising an adder 113 and a latch 114 whose output is presettable to zero and which is clocked at the picture element rate so that the latch 114 contains the value $\Delta$x'V·$\Delta$y'H, the output of latch 114 being connected to output 279.

The outputs of latches 103 and 104 are connected to a first input of an adder 115 which together with a latch 116 having its output presettable to zero forms an accumulator. The fractional part of $x_1$ is entered into the acumulator at the start of a field and the value of $\Delta$xV is added at the line rate. The contents are monitored 117 to determine when the added fractional values add to the next integer (up or down) and an output is produced to increment or decrement the counter 105 which sets the position from which the sample counter in the store write control unit 204 starts each line.

The outputs of latches 108 and 116 are fed to first and second inputs of a multiplexer 118 which selects the output of latch 116 to feed to an accumulator which comprises an adder 119 and a latch 120 which has outputs resettable to zero at the start of each line. The multiplexer then connects the output of latch 108 to the accumulator which is clocked at the picture element rate. The output of the accumulator is monitored 121 and the output 252 activated to present increment or decrement signals to the sample address counter in the store write control unit 204. The output of the latch 120 is fed to output 276 as the value $x_F$.

It should be noted that the values $\Delta$xH, $\Delta^2$xH, $\Delta$xV, $\Delta^2$xV, and $x_F$ may be positive or negative and hence the accumulators may increment or decrement. Thus the output values of outputs 275 and 252 may be such that the address counters in the store write control unit are caused to increment or decrement.

The latches 100, 101, 102, 103 108, and 111 may be formed by standard TTL type 74LS374 integrated circuits, the input values being in 12 bit parallel form, while the latches 107,110,114,116, and 120 may be type 74LS273 integrated circuits and the counter 105 a type 74LS191 integrated circuit. A suitable circuit for the multiplier 112 is that sold by TRW Inc under the type reference MPY112K while the adders by be formed from type 74LS283 integrated circuits.

Figure 10:
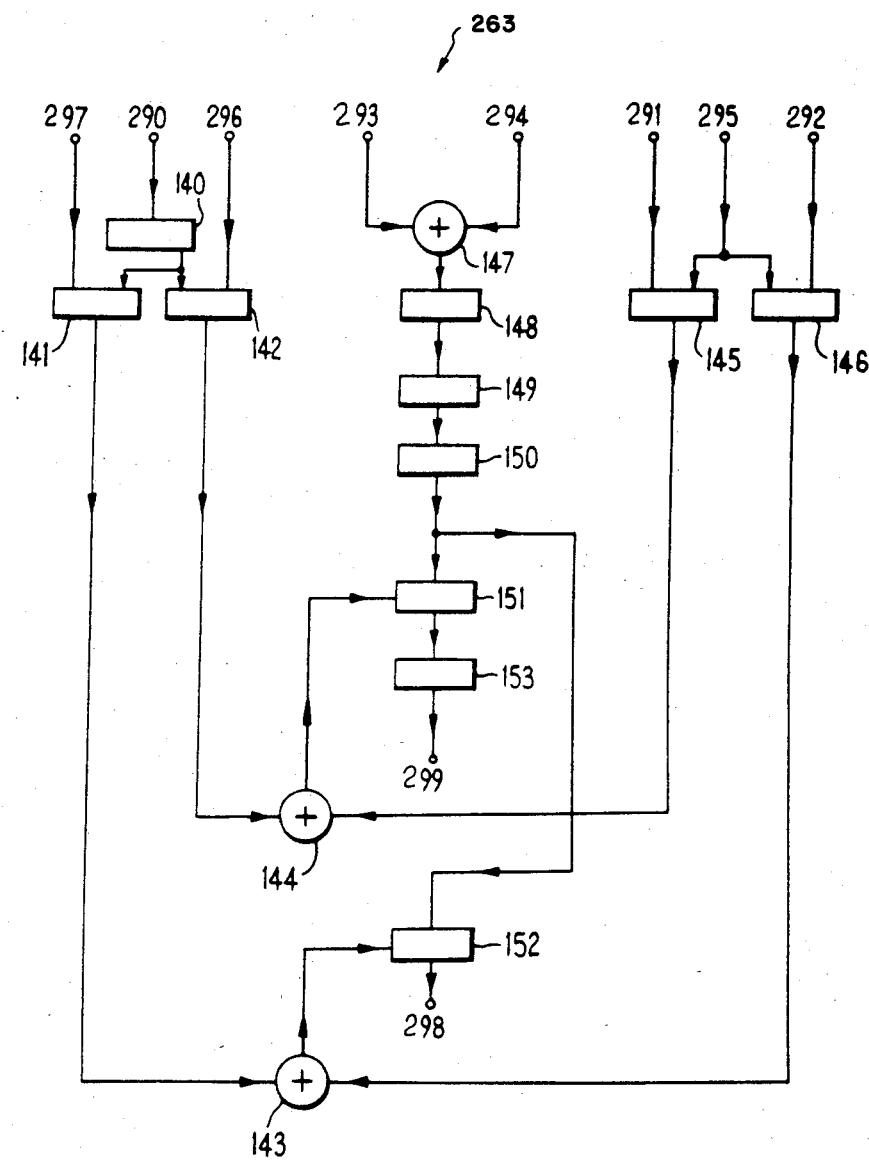
FIG. 10 shows a further part of the hardware calculator of FIG. 8 in greater detail.

FIG. 10 shows an embodiment of the block 263 which calculates $x_{Ip}$ and $y_{Ip}$ from inputs $x_F$, $\Delta$x'H, $\Delta$x'V, $y_F$, $\overline{\Delta y'H}$, $\overline{\Delta y'V}$, $\Delta$x'V·$\Delta$y'H, and $\Delta$x'H·$\Delta$y'V. The value $x_F$ is applied to input 290 and inverted by an inverter 140 whose output is connected to a first input of each of two multipliers 141 and 142. The value $\Delta$y'V is applied to the second input of multiplier 141 via input 297 while the value of $\Delta$y'H is applied to the second input of multiplier 142 via input 296. The multiplier 141 produces the value $-x_F\Delta$y'V at its output and this is applied to a first input of an adder 143. The multiplier 142 produces the value $-x_F\Delta$y'H at its output and this applied to a first input of an adder 144. Similarly the value $y_F$ is applied via input 295 to a first input of each of two multipliers 145 and 146. The value of x'H is applied via input 91 to the second input of multiplier 145 while the value of $\Delta$x'V is applied via input 292 to the second input of multiplier 146. The multiplier 145 produces the value $y_F\Delta$x'H at its output and this is applied to the second input of the adder 144. Similarly the multiplier 146 produces the value $y_F\Delta$x'V at its output and this is applied to the second input of the adder 143.

The value $\Delta$x'V·$\Delta$y'H is fed via input 293 to the first input of an adder 147 while the value y'V·$\Delta$x'H is fed via input 294 to the second input of the adder 147. The adder produces the value $\Delta$y'V·$\Delta$x'H−$\Delta$x'V·$\Delta$y'H at its output and this is fed to a latch 148 whose output addresses a read only memory 149 which is programmed to convert the value $\Delta$y'V·$\Delta$x'H−$\Delta$x'V·$\Delta$y'H to 1/($\Delta$y'V·$\Delta$x'H−$\Delta$x'V·$\Delta$y'H). This value is fed via a latch 150 to a first input of a multiplier 151 and to a first input of a multiplier 152. The output of the adder 144 is fed to the second input of the multiplier 151 while the output of the adder 143 is fed to the second input of the multiplier 152. The output of multipler 152 which is the value ($y_F$·$\Delta$x'V−$x_F$·$\Delta$y'Y)/($\Delta$y'V·$\Delta$x'H−$\Delta$x'V·$\Delta$y'H) is applied to output 298 as the value $x_{Ip}$, while the output of the multiplier 151 is inverted in an inverter 153 to produce a value $-(y_F\Delta$x'H$-x_F\Delta$y'H)/($\Delta$y'V·$\Delta$x'H−$\Delta$x'V·$\Delta$y'H) which is applied to output 299 as the value $y_{Ip}$.

The multipliers 141, 142, 145, 146, 151 and 152 may be those sold by TRW Inc. under the type reference MPY08HJ since the values are truncated to 8 bits before multiplication while the latches 148 and 150 may be formed from TTL type 74LS273 integrated circuits and the adders 143 and 144 may be formed from TTL type 74LS283 integrated circuits.

The values $x_{Ip}$ and $y_{Ip}$ are fed to the interpolator 205 to enable the signal from the picture source to be interpolated as required before being applied to the field store 207.

FIGS. 11 to 17 show an embodiment of means for compressing and/or expanding the size of a television picture represented by an input video signal suitable for use as the compressing means 11,24 and 25.

Figure 11:
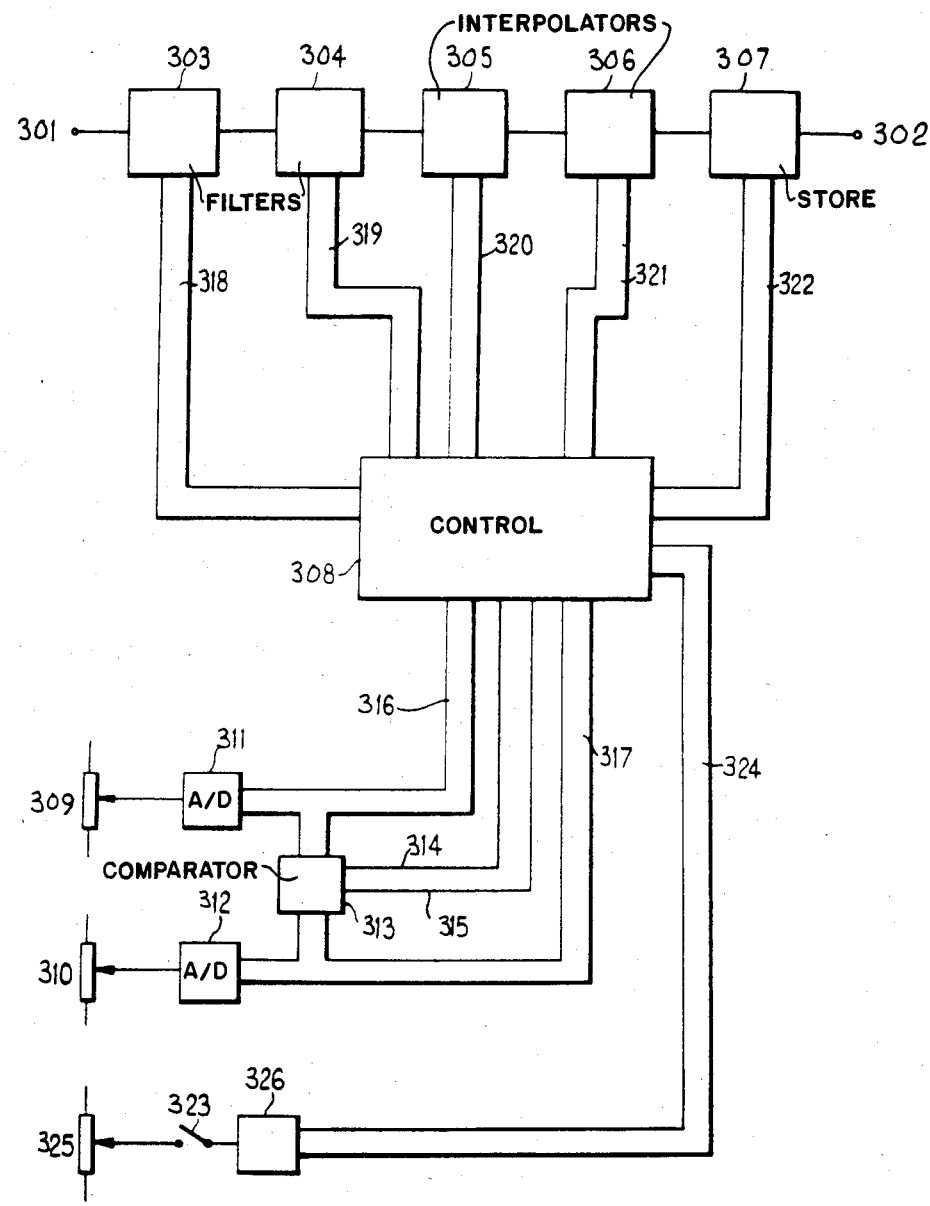
FIG. 11 shows in block schematic form a video signal processing arrangement suitable for use as the compressing and/or expanding means of FIG. 1 or FIG. 2.

FIG. 11 shows a video signal processing circuit having a video signal input 301 and a processed video signal output 302. Between the input 301 and output 302 is arranged a vertical filter 303, a horizontal filter 304, a vertical interpolator 305, a horizontal interpolator 306, and a field store 307. It should be noted that throughout this specification the term horizontal refers to the line scan direction and vertical refers to the field scan direction.

The television picture required for display may be the same size as that represented by the input video signal, an expanded (or zoomed) version of the input video signal, or a compressed (or squeezed) version of the input signal. The expansion or compression may be in either the vertical or horizontal direction or both simultaneously. In particular, the picture may be squeezed in one direction and zoomed in the other.

If a picture is squeezed or zoomed, then it is desirable to use interpolators to derive intermediate samples from the normal sized picture samples. If the picture is to be squeezed it is necessary to perform the interpolation before entering the sample in the field store, whereas if the picture is to be zoomed, the interpolation should be carried out on the samples taken from the store. This has previously been achieved by providing separate interpolators connected both before and after the store.

The arrangement shown in FIG. 11 includes a control circuit 308 which produces a number of signals which control the bandwidths of the vertical and horizontal filters 303 and 304, control the interpolators 305 and 306 to cause them to perform the necessary calculations to determine the intermediate sample values, control the addressing of the store to determine the position within the store at which the samples are stored, and cause the arrangement of the interpolators 305 and 306 and store 307 to be re-configured so that the interpolators can be selectively positioned either before or after the store.

Two control potentiometers 309 and 310 control the vertical and horizontal picture size, respectively. The voltages produced by these potentiometers are converted into a digital signal by means of two analog-to-digital converters 311 and 312. The outputs of the analogue to digital converters (ADCs) 311 and 312 are connected to a comparator arrangement 313 which produces first and second outputs to indicate whether the signal is to be vertically or horizontally zoomed, these signals being conveyed to the control circuit 308 over lines 314 and 315. The output of the ADC's 311 and 312 are also fed to the control circuit 308 over data paths 316 and 317, respectively.

The control circuit 308 controls the bandwidth of the filters 303 and 304 by means of signals passed over data paths 318 and 319, respectively, and controls the interpolators 305 and 306 over data paths 320 and 321, respectively. The interpolators 305 and 306 are provided with control signals which indicate the picture size and hence enable the interpolator to determine the sample positions which have to be calculated and further signals to control their positions relative to the store 307. The control circuit 308 provides signals over a data path 322 to the store 307 to indicate the position within the store at which the picture is to be stored and the position in the circuit arrangement of the store 307 relative to the interpolators 305 and 306. A switch 323 is connected to the control circuit 308 via a path 324 to cause the control circuit to produce filter co-efficients for the horizontal and vertical filters 303 and 304 which cause their cut-off frequencies to assume a minimum value. This produces an effect on the displayed picture analogous to a soft-focus effect. A potentiometer 325 and an analog-to-digital converter (ADC) 326 may be included to enable the cut-off frequency of either or both filters to be made adjustable.

Figure 12:
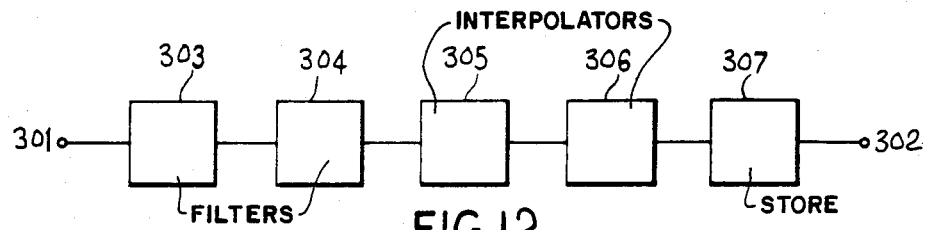
FIGS. 12 to 15 illustrate the alternative store and interpolator positions in the arrangement of FIG. 11 for various signal processing states.
Figure 13:
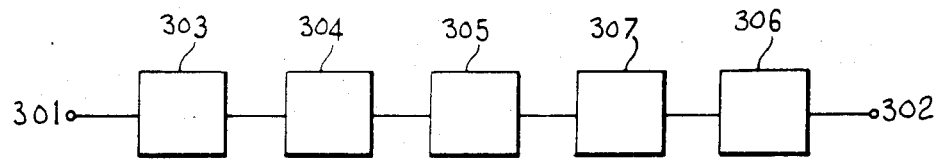
Figure 14:
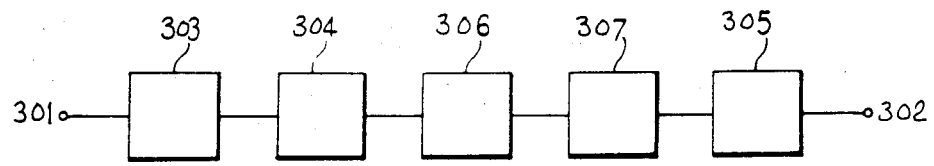
Figure 15:
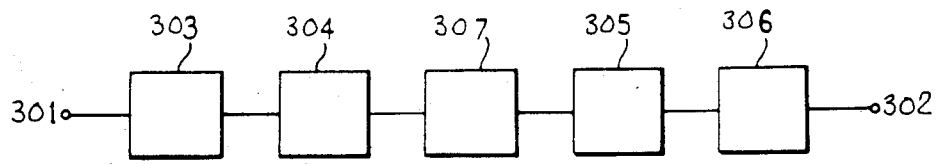

FIGS. 12 to 15 illustrate how the interpolators 305, 306 and store 307 are reconfigured for various combinations of vertical and horizontal squeeze and zoom. FIG. 12 shows the configuration for a normal size picture or one which is squeezed in either or both directions without a zoom in either direction. In this case both the horizontal and vertical interpolators 306 and 305 operate on the video signal before it is stored and in addition the horizontal and vertical filters 304 and 303 are controlled to have a cut-off frequency which is dependent on the picture size i.e. as the picture size is reduced the cut-off frequency is reduced (the horizontal and vertical filters are low pass filters). FIG. 13 shows the configuration when the picture is squeezed in the vertical direction and zoomed in the horizontal direction. In this case the horizontal filter 304 is disabled to form an essentially straight through path, the vertical interpolator 305 is arranged before the store 307 and the horizontal interpolator 306 is arranged after the store 307. FIG. 14 shows the configuration when the picture is squeezed in the horizontal direction and zoomed in the vertical direction. In this case the vertical filter 303 is disabled to form an essentially straight through path, the horizontal interpolator 306 is arranged before the store 307 and the vertical interpolator 305 is arranged after the store 307. FIG. 15 shows the configuration when the picture is zoomed in both the horizontal and vertical directions. In this case both the vertical and horizontal filters 303 and 304 are disabled and both the vertical and horizontal interpolators 305 and 306 are arranged after the store 307. The positions of the vertical and horizontal filters 303 and 304 may be reversed so that the horizontal filter 304 comes before the vertical filter 303, the choice of which comes first being purely arbitrary. Similarly when both interpolators are on the same side of the store, i.e. as shown in FIG. 12 and FIG. 15, it is not important which comes first.

Figure 16:
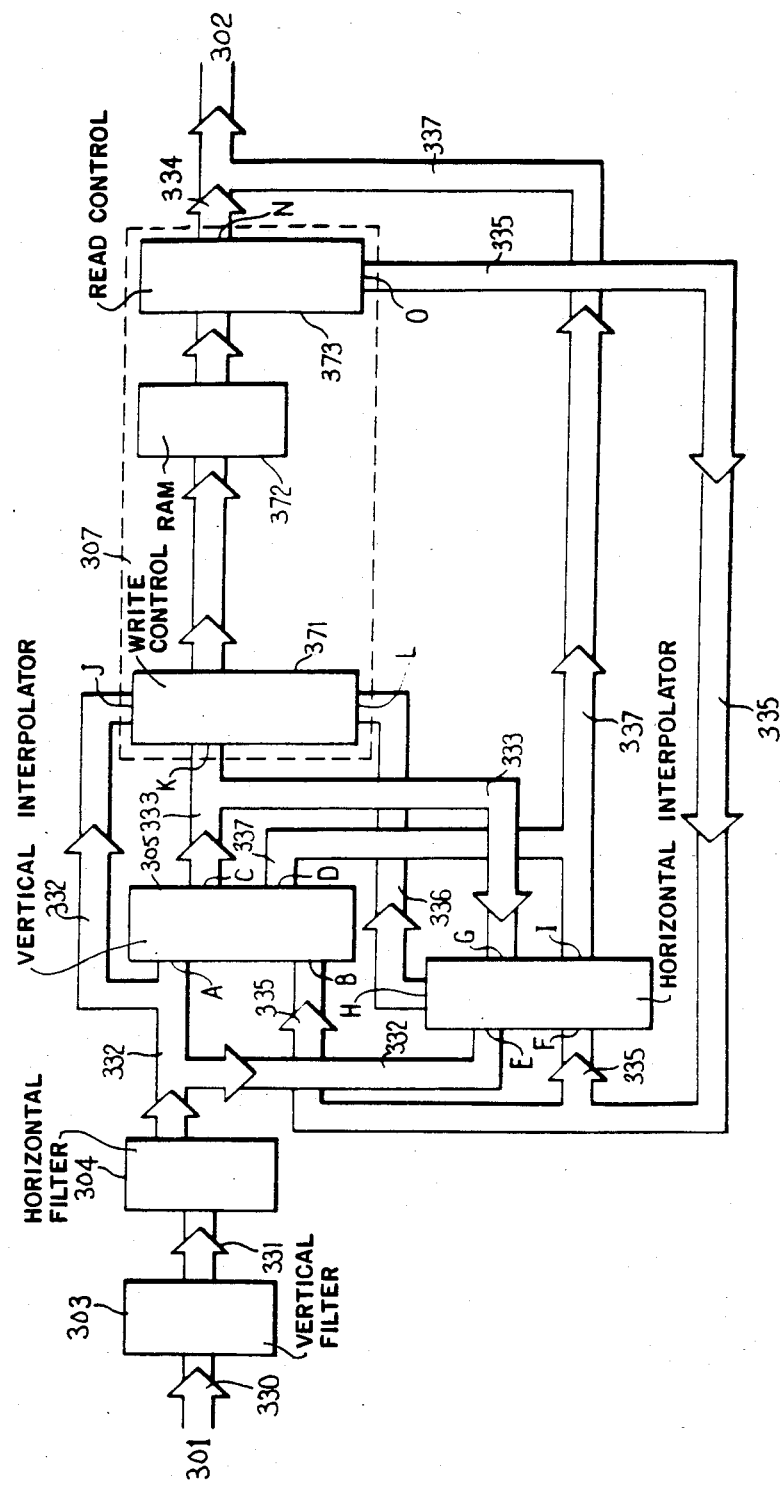
FIG. 16 illustrates the interconnection of circuit units to enable the achievement of the configurations of FIGS. 12 to 15.

FIG. 16 illustrates how the vertical and horizontal filters 303 and 304, the vertical and horizontal interpolators 305 and 306, and the store 307 may be interconnected to allow them to be configurable as shown in FIGS. 12 to 15. The input 301 is connected to the input of the vertical filter 303 by a data path 330 while the output of the vertical filter 303 is connected to the input of the horizontal filter 304 via a data path 331. The output of the horizontal filter 304 is connected via a data path 332 to a first input A of the vertical interpolator 305, to a first input E of the horizontal interpolator 306, and to a first input J of the store 307. A first output C of the vertical interpolator 305 is connected via a data path 333 to a second input K of the store 307 and to a second input G of the horizontal interpolator 306. A first output N of the store 307 is connected via a data path 334 to the output 302 of the arrangement. A second output O of the store 307 is connected via a data path 335 to a second input B of the vertical interpolator 305 and to a third input F of the horizontal interpolator 306. A first output H of the horizontal interpolator 306 is connected to a third input L of the store 307 via a data path 336 while a second output I of the horizontal interpolator 306 is connected via a data path 337 to a second output D of the vertical interpolator 305 and to the output 302 of the arrangement. The store 307 comprises a write control circuit 371, a block of random access memory (RAM) 372, and a read control circuit 373. The inputs to the store 307 are by way of the write control circuit 371 while the outputs are available from the read control circuit 373. The inputs of the interpolators 305 and 306 and the store 307 are connected to the data paths by way of latches so that by enabling the appropriate latch at the appropriate time the information on a data path connected to that input may be either accepted into the corresponding interpolator or stored or ignored. Similarly, the outputs of the interpolators and store are coupled via latches or buffers which are selectively enabled. It should be noted that where two outputs are connected to a single data path, the latches or buffers should have tri-state outputs.

When the arrangement is set for a normal sized or a squeezed picture without a zoom in either direction, i.e. as shown in FIG. 12 the latches at the first input A of the vertical interpolator 305 are enabled so that data from the output of the filter 304 can be entered into the vertical interpolator 305. However, the latches at the first inputs E and J of the horizontal interpolator 306 and store 307 are disabled so that no data from path 332 enters these circuits. The first output C of the vertical interpolator 305 is enabled and so is the second input G of the horizontal interpolator 306. Hence the data from the first output C of the vertical interpolator 305 is fed via path 33 to the second input G of the horizontal interpolator 306 and accepted by the horizontal interpolator 306. However the second input K of the store 307 is not enabled and hence the store 307 ignores information on the data path 333. The first output H of the horizontal interpolator 306 is enabled and so is the third input L of the store so that data from the horizontal interpolator 306 is fed via the data path 336 to the store 307. The first output N of the store 307 is enabled and so the output of the store is fed via path 334 to the output 202 of the arrangement. The second output D of the vertical interpolator 305 and the second output I of the horizontal interpolator 306 are not enabled so there is no conflicting data presented to the output 302. Thus by enabling the first input A and first output C of the vertical interpolator 305, the second input G and first output H of the horizontal interpolator 306, and the third input L and first output N of the store 307 while disabling all other inputs and outputs of the store and interpolators, the arrangement is configured as shown in FIG. 12. Similarly, to arrive at the configuration shown in FIG. 13 the first input A and first output C of the vertical interpolator 305 are enabled, the second input K and second output O of the store 307 are enabled, and the third input F and second output I of the horizontal interpolator 306 are enabled while all other inputs and outputs are disabled. The configurations shown in FIGS. 14 and 15 can be similarly derived. It should be noted that it is only necessary to disable those outputs which are connected to other outputs and thus some of the outputs may be permanently enabled provided the inputs to which they are connected can be selectively enabled and disabled. This can lead to a simplification of the control circuit.

Returning to the arrangement shown in FIG. 11 the filters 303 and 304 are low pass digital filters whose co-efficients are fed to them over the data paths 318 and 319 respectively from the control circuit 308. The filters 303 and 304 are arranged to track the picture size i.e. they have a maximum cut-off frequency when the picture size is normal and the cut-off frequency is reduced as the picture size is reduced. When the picture is zoomed the filters may be disabled to provide an essentially straight through path. The cut-off frequency of the filters is determined by the co-efficients fed to them over the paths 318 and 319 from the control circuit 308 which derives the required co-efficients from the picture size information fed to it via paths 316 and 317 possibly in conjunction with the signals on lines 314 and 315. To produce the filter co-efficients the control circuit 308 includes a read only memory having memory locations addressed by the outputs of the ADC's 311 and 312. The ADC's 311 and 312 produce digital codes which represent the picture size as set up by the potentiometers 309 and 310. At each memory location a set of filter co-efficients are stored which have been pre-calculated to produce the desired cut-off frequency for the size of picture represented by the memory location address. The disabling of the filters 303 and 304 may be controlled by the signals on lines 314 and 315 which indicate that a picture zoom has been selected. The comparator arrangement 313 takes the outputs of the ADC's 311 and 312 and compares them with a preset number to determine whether a picture zoom has been selected in either the vertical or horizontal direction. Thus if the comparator 313 detects that a picture zoom has been selected, it causes a signal to be passed to the control circuit 308 over line 314 and/or 315. The control circuit 308 includes a read only memory which encodes the signals on lines 314 and 315 to produce appropriate enable signals for the inputs and outputs of the vertical and horizontal interpolators 305 and 306 and store 307 which are passed to these units over the data paths 320, 321 and 322 respectively the read only memory may be programmed as shown in Table 2, an enable signal corresponding to a stored '0' and a disable signal corresponding to a stored '1'.

TABLE 2

| INPUT | ADDRESS | STORE CONTENTS | | | | | | | | | | | | | FIGURE |
| 314 | 315 | A | B | C | D | E | F | G | H | I | J | K | L | N | O | CHOICE |
|---|---|---|---|---|---|---|---|---|---|---|---|---|---|---|---|---|
| 0 | 0 | 0 | 1 | 0 | 1 | 1 | 1 | 0 | 0 | 1 | 1 | 1 | 0 | 0 | 0 | 12 |
| 0 | 1 | 1 | 0 | 0 | 0 | 0 | 1 | 1 | 0 | 1 | 1 | 1 | 0 | 1 | 0 | 14 |
| 1 | 0 | 0 | 1 | 0 | 1 | 1 | 0 | 1 | 0 | 0 | 1 | 0 | 1 | 1 | 0 | 13 |
| 1 | 1 | 1 | 0 | 0 | 1 | 1 | 1 | 0 | 0 | 0 | 0 | 1 | 1 | 1 | 0 | 15 |

The capacity of the read only memory may be reduced by inspection of the contents of table 2. For example where the state of an output does not change as the address changes the corresponding latch or buffer may be permanently connected to a fixed enabling potential. Further certain inputs/outputs have common states and these may be tied together.

Figure 17:
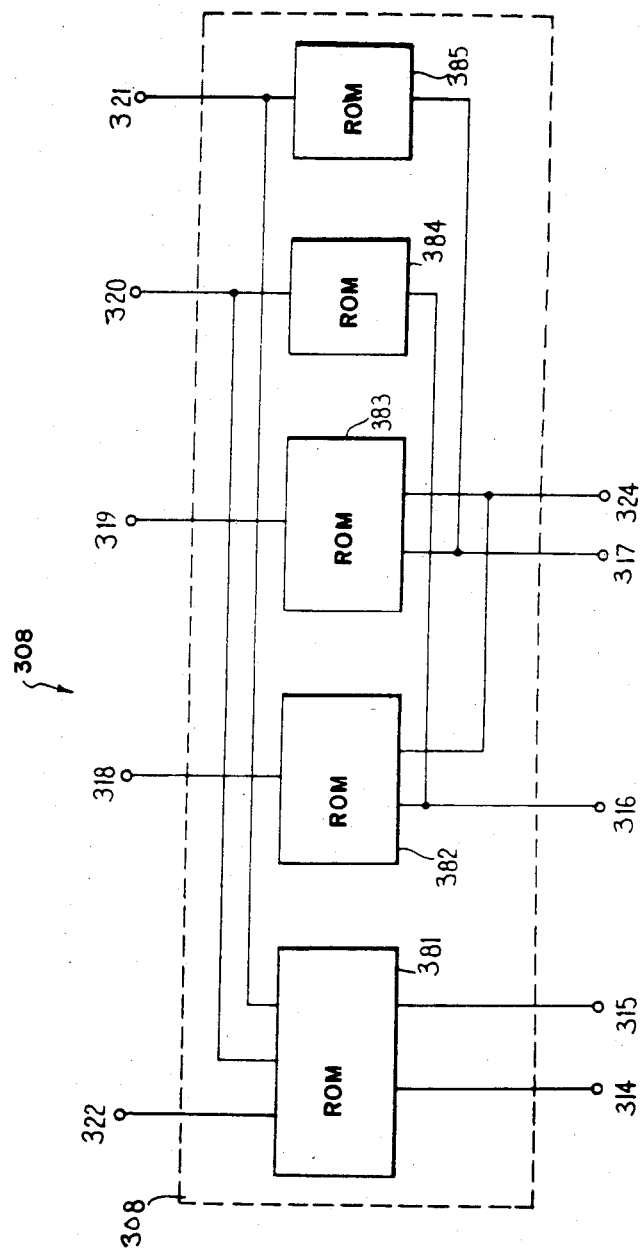
FIG. 17 shows a control circuit suitable for use in the arrangement of FIG. 11.

FIG. 17 shows the control circuit 308 in further detail. The control circuit 308 comprises five banks of read only memory (ROM) 381,382,383,384 and 385. The ROM 381 is addressed by the signals on lines 314 and 315 and is programmed as shown in table 2. The outputs of the ROM 381 are fed to the vertical interpolator 305 over the path 320, to the horizontal interpolator 306 over the path 321, and to the store 307 over the path 322. The ROM 382 contains the co-efficients for the vertical filter 303 and is addressed over the path 316 so that it outputs filter co-efficients over the path 318 to the filter 303 which are dependent on the picture size in the vertical direction set by the potentiometer 309. The stored co-efficients may be pre-calculated in a known manner from a knowledge of the cut-off frequency desired for given picture sizes. The smoothness of cut-off frequency change will be dependent on the size of ROM used. Similarly the ROM 383 contains the co-efficients for the horizontal filter 304 and is addressed over the path 317 so that it outputs filter co-efficients over the path 319 to the filter 304 which are dependent on the picture size in the horizontal direction set by the potentiometer 310. The ROM 384 is addressed over the path 316 and outputs a code over the path 320 to the vertical interpolator 305 which is dependent on the vertical picture size set by the potentiometer 309. The interpolator 305 uses this code to determine the required sample positions. Similarly the ROM 385 is addressed over the path 317 and outputs a code over the path 321 to the horizontal interpolator 306 which is dependent on the horizontal size of the picture as set by the potentiometer 310. The path 324 is connected to the ROM's 382 and 383 to cause them to output filter coefficients to the filters 303 and 304 which produce the lowest cut-off frequencies of those filters. Thus by operating the switch 323, a soft focus effect can be produced. The signal on path 324 overules the signals on paths 316 and 317 and appropriate decoding circuitry is included in or before the ROM's 382 and 383.

Various modifications may be made to the embodiment shown. For example, alternative arrangements may be used for selecting the picture sizes including pattern generators which may be microprocessor controlled or comprise micro or mini computers. Alternative methods of re-configuring the arrangement of the interpolators and store may be used, the illustrated embodiment being only a convenient arrangement amongst other possible arrangements.

The arrangement shown is suitable for use in a luminance channel and could be repeated for the color difference signals. The horizontal and vertical filters may be omitted if the decrease in performance can be tolerated and in particular they are less necessary in the color difference signal channel. Similarly the performance of the interpolators is not so critical in the color difference channel.

The combining means 26 may be in the form of a fading circuit as shown in FIGS. 18 to 21 and may additionally include switching means to allow switching between two or more video signal inputs at the picture element sampling rate so that the number of video input signals may be increased by adding further compressing means for each video input signal and switching between them.

Figure 18:
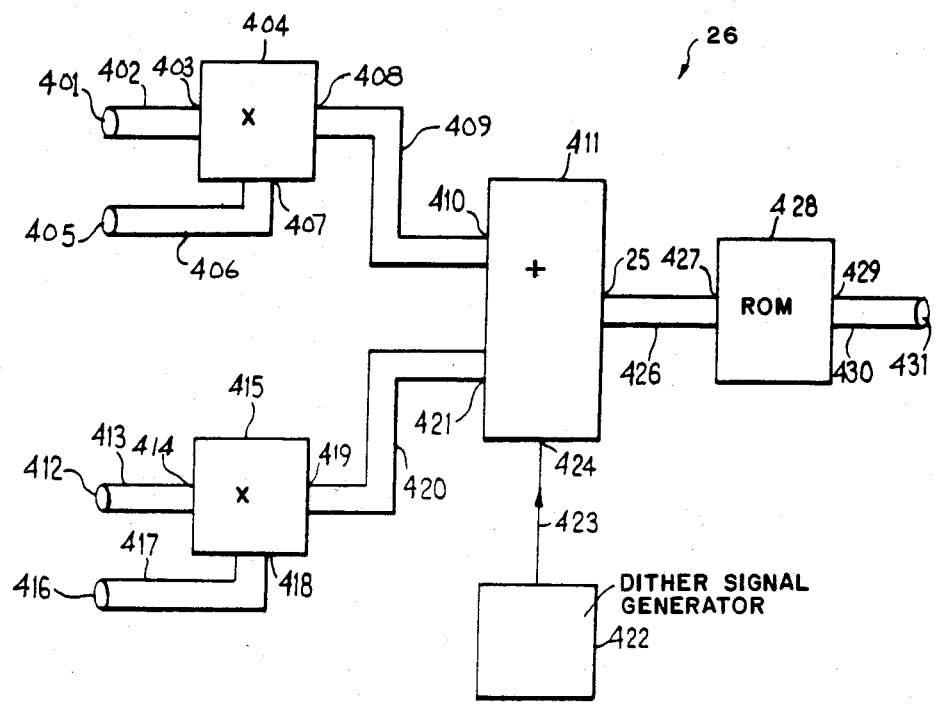
FIG. 18 is a block diagram of a fading circuit which may be used as the combining means in the arrangement shown in FIG. 2.

As shown in FIG. 18 the combining means comprises a fading circuit which has an input 401 which is connected via an eight bit bus 402 to a first set of inputs 403 of a multiplier circuit 404. A second input 405 is connected via an eight bit bus 406 to a second set of inputs 407 of the multiplier 404. A set of outputs 408 of the multiplier 404 is connected via a nine bit bus 409 to a first set of inputs 410 of an adding arrangement 411. A third input 412 is connected via an eight bit bus 413 to a first set of inputs 414 of a second multiplier circuit 415, while a fourth input 416 is connected via an eight bit bus 417 to a second set of inputs 418 of the multiplier 415. The output 419 of the multiplier 415 is fed via a nine bit bus 420 to a second set of inputs 421 of the adding arrangement 411. A dither signal generator 422 is connected via a line 423 to a third input 424 of the adder arrangement 411. The output 425 of the adder arrangement 411 is fed via an eight bit bus 426 to the input 427 of a read only memory 428 whose output 429 is fed via an eight bit bus 430 to the output 431 of the fading circuit.

In operation video signals which may be encoded as an eight bit PCM signal at a repetition rate of 13.5 Mhz are applied to inputs 401 and 412. Fading control signals in the form of eight bit binary codes are applied to inputs 405 and 416. In each of the multipliers 404 and 415 the video signal is multiplied by the fading control signal to form a sixteen bit output. The most significant nine bits of the sixteen bit output are fed via the buses 409 and 420 respectively to the adding arrangement 411. In the simple case of two video inputs 401 and 412 as shown in FIG. 18 the adding arrangement 411 may comprise simply a full binary adder. The dither signal generator 422 produces a signal which is randomly a binary '0' or binary '1' the signal varying randomly at the clock rate of 13.5 Mhz so that a digital '1' or '0' is randomly added to the ninth most significant bit of each sample of the video signal in the adder 411. This will cause the eighth most significant bit at the output 415 of the adding arrangement 411 to change randomly.

When two 8 bit binary numbers are multiplied a basic gain error occurs of 1/256th of the answer. To overcome this problem the output from the adding arrangement 411 is fed to a read only memory 428 which is encoded so that the output of the read only memory 428 is equal to the output of the adding arrangement 411 plus 1/256th of the output of the adding arrangement 411. This corrects the basic gain error before the video signal is applied to the output 431 of the fading circuit.

The multipliers 404 and 415 may be formed by the integrated circuit sold by TRW Incoroporated under the type No. MPY8HUJ. The adding arrangement 411 may be formed from TTL full binary adders type 74S283. The dither signal generator 422 may be a psuedo random binary sequence generator formed by shift register stages as shown in FIG. 403.

Figure 19:
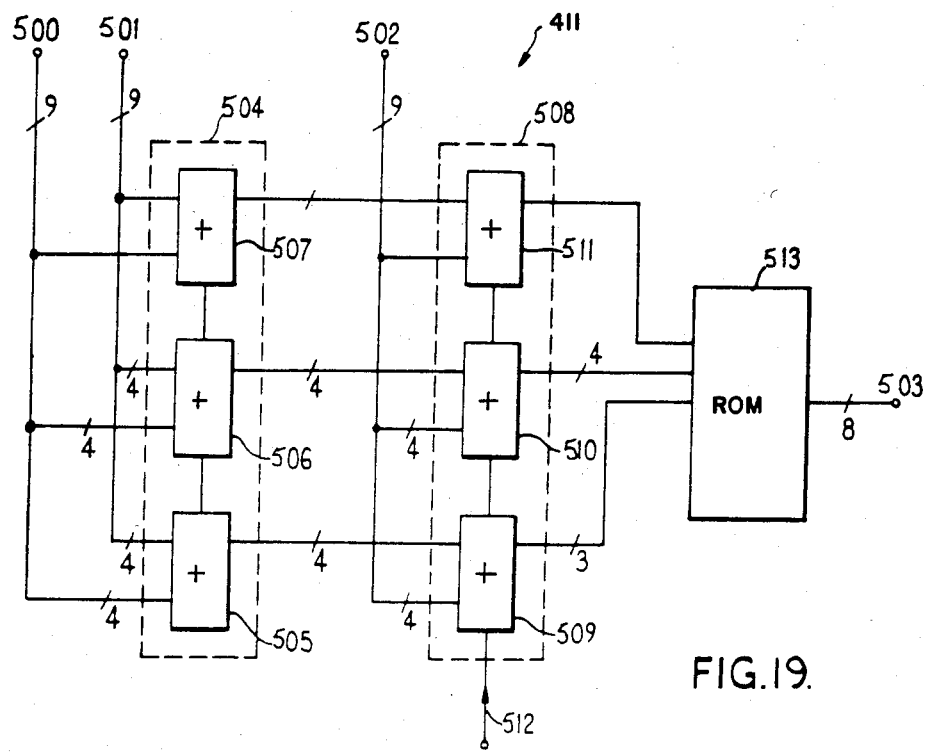
FIG. 19 is a block diagram of an embodiment of an adding arrangement suitable for use in a fading circuit similar to that shown in FIG. 18 but having three video signal inputs.

The number of video input signals is limited only by what is economical and by the number of video signals it is feasible to control, and a corresponding number of multipliers and fading control signal inputs would be provided. The adding arrangement 411 would then need to be designed to cater for adding more than two signals together. This can be achieved by cascading adder stages as is shown in FIG. 19. The fading control signals will normally be produced by a microprocessor and this can be programmed to ensure that the fading control signals are such that the adder does not overflow.

FIG. 19 shows in greater detail one embodiment of an adding arrangement 411 for a fading circuit similar to that shown in FIG. 18, but having three video signal inputs, three multipliers, and three fading control signal inputs. FIG. 19 has three inputs 500, 501 and 502 for multiplied video signals A, B and C (not shown). The multiplied video signals A and B are added in a first adder 504 which comprises three type 74S283 full adders 505, 506 and 507. Each of the full adders is capable of adding two four bit numbers. The four least significant bits of the input signals A and B are added in the adder 505 and the carry output of adder 505 is connected to the carry input of adder 506. The next four more significant bits are added in the adder 506 and the carry output of the adder 506 is connected to the carry input of the adder 507. The most significant bit of the signals A and B are added in the adder 507 together with the carry input from the adder 106. In order to add the multiplied third signal C applied to terminal 502 a second adding arrangement 508 is provided. The adding arrangement 508 comprises three four bit adders 509, 510 and 511. The carry output of adder 509 is connected to the carry input of adder 510 and the carry output of adder 510 is connected to the carry input of adder 511. The dither signal is applied via a line 512 to the carry input of adder 509. The nine bits of the signal C are divided so that the most significant bit is connected to the input of the adder 511, the next four bits are connected to the input of adder 510 and the last four bits are connected to the input of adder 509. Similarly, the four bits from the output of adder 505 are connected to inputs of adder 509. The four bits from the output of the adder 506 are connected to the input of adder 510 and the one or two bit output of the adder 507 is connected to the input of adder 511.

The maximum result of this addition is an eleven bit number. However, if the fading control signal inputs are chosen so that $$Va \times Fa + Vb \times Fb + Vc \times Fc \leq 1$$

where Va, Vb, Vc are the video signals applied to multipliers a,b, and c and Fa, Fb, Vc are the fading control signals applied to multipliers a,b, and c then the maximum result of the addition is a nine bit number.

Figure 21:
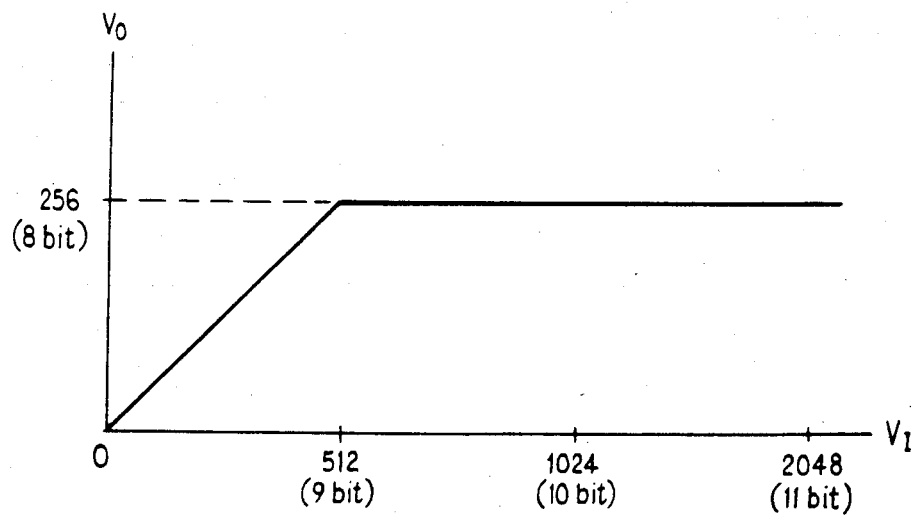
FIG. 21 shows the transfer characteristic of a read only memory suitable for use in the fading circuit shown in FIG. 18.

A nine or eleven bit output from the adder 508 is connected to a read only memory (ROM) 513. The eleven bits are selected such that the three least significant bits of the output of the adder 511 forms the three most significant bits, the four bit output from the adder 510 form the next four most significant bits and the four bit of the output of adder 509 form the four least significant bits of the output of the adder 508. As described with reference to FIG. 1 the ROM 513 takes the output of the adder 508 and adds 1/256th of the output of the adder 508 to the output of the adder 508 to form a video output signal which is connected to output 503. The ROM 513 is programmed to give the transfer function $V_o/V_I$ illustrated in FIG. 21. As can be seen in FIG. 21 the data in the linear region, i.e. an input value up to 512, is divided by two. Any input value $V_I$ above 512 is limited to give an output $V_o$ of 256.

Figure 20:
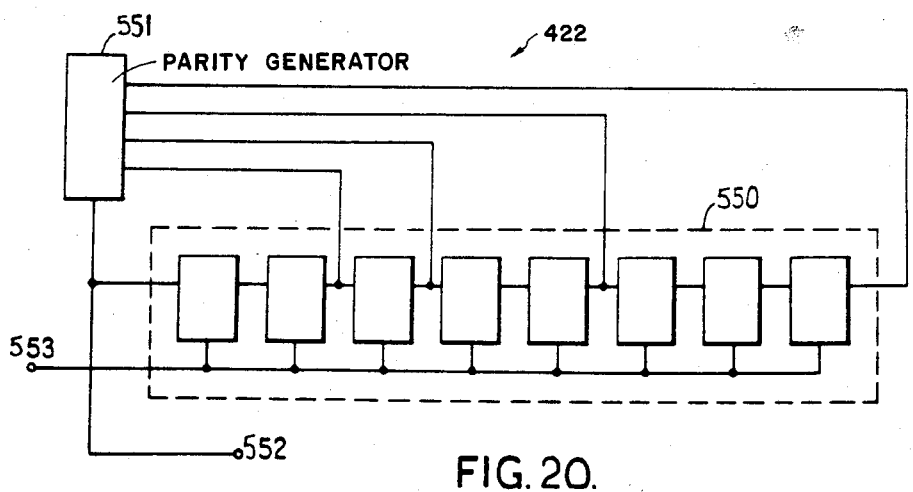
FIG. 20 shows a block diagram of a dither signal generator, in the form of a psuedo random binary sequence generator, for use in the fading circuit of FIG. 18.

FIG. 20 shows a pseudo random binary sequence generator which is suitable for use as the dither signal generator 422 in FIG. 18. The pseudo random binary sequence generator comprises an eight bit shift register 550 the second, third, fifth and eighth stages of which are fed to first, second, third and fourth inputs of a parity generator 551. The output of the parity generator 551 is fed to the input of the shift register 550 and also forms the output of the dither signal generator and is connected to an output terminal 552. A clock signal is applied to a terminal 553, and from there, to the clock input of the shift register 550. The shift register may be formed by a type 74S164 TTL integrated circuit while the parity generator may be a type 74S280 TTL integrated circuit. Either the odd or even parity output may be connected to the input of the shift register 550, and either of these outputs may be connected to the output terminal 552. Alternatively, any of the inputs to the parity generator 551 could be connected to the output terminal 552 instead of the even or odd parity output from the parity generator 551.

Alternative forms of dither signal generator could be used; for example, a comparator having a first input connected to a constant potential and the second input connected to a reference source which produces a reference signal having a randomly varying amplitude in which all amplitude values are equi-probable, the range of amplitudes being substantially equal to twice the reference potential. The reference source may, for example, be constructed as described in a paper entitled "A Uniformly distributed analogue random voltage generator" by F. Castanie, which was published in Proceedings of the IEEE, Vol. 66, No. 5, May 1978 at pages 605 to 606. The output of the comparator will randomly vary between the binary '1' to '0' states depending on whether the random source generator is producing a voltage which is above or below the reference voltage.

We claim:

1. A video signal processing arrangement for processing television signals encoded in digital form comprising:
   compressor/expander for compressing and/or expanding a television picture represented by the video signal;
   rotator for rotating said television picture, said rotator being separate from said compressor/expander; and
   rotator switching means for switching said rotator between a position prior to or subsequent to said compressor/expander in said video processing arrangement, and for maintaining a by-pass path around said rotator for a period equal to a signal delay introduced by said rotator.

2. A video signal processing arrangement for processing television signals encoded in digital form comprising:
   first video signal input for receiving a first video signal;
   second video signal input for receiving a second video signal;
   first compressor/expander for compressing and/or expanding a television picture represented by said first video signal;
   second compressor/expander for compressing and/or expanding a television picture represented by said second video signal;
   combining means for combining the outputs of said first compressor/expander and said second compressor/expander;
   rotator for rotating the television pictures represented by said first and second video signals, said rotator being separate from said first compressor-/expander and said second compressor/expander; and
   rotator switching means for switching said rotator between a position prior to said first compressor/expander and said second compressor/expander, and a position subsequent to said combining means in said video processing arrangement, and for maintaining a by-pass path around said rotator for a period equal to a signal delay introduced by said rotator.

3. The video signal processing arrangement in claim 2, wherein said rotator switching means can additionally switch said rotator to a position located between said first compressor/expander and said combining means, or said second compressor/expander and said combining means in said video processing arrangement.

* * * * *